Patented July 26, 1932

1,868,999

UNITED STATES PATENT OFFICE

OTTO STROBACH AND PAUL ALBERT WICKMANN, OF LEIPZIG, GERMANY

METHOD FOR THE EXTRACTION OF TEA AROMA

No Drawing. Application filed September 9, 1929, Serial No. 391,518, and in Germany June 25, 1929.

The present invention relates to an improved product in the form of concentrated tea-aroma suitable for flavoring products to which the characteristic aroma and flavor of tea is to be imparted, as well as to improved methods for the extraction of the aromatic and other flavoring constituents of tea for the purpose of producing the said tea-aroma and mixed products containing the same.

One of the objects of the invention is to treat plants of the general nature of tea (and which include such tea substitutes as mate, mulberry leaves and other plants usually employed to prepare steeped beverages such as tea) in such a manner as to extract therefrom those volatile peculiarly aromatic substances that are usually dissipated into the air when steeping the entire tea leaves, as when brewing the tea by steeping the leaves in boiling or hot water.

A further object of the invention is to extract from the tea leaves or plant, by means of suitable organic solvents, the aromatic principles of the tea, and thereafter to purify the extracted tea-aroma so as to render the same commercially available.

Still a further object of the invention is to treat the tea plant or tea leaves with an organic solvent capable of dissolving the aromatic constituents of the tea and to condense the said aroma.

Further objects of the invention appear hereinbelow in connection with a description of the process that leads to the desired end-products, and in the claim hereunto appended.

In its broadest aspects, the invention comprises the extraction of tea leaves or their equivalent with an organic solvent such as either a volatile solvent of the nature of ether, chloroform, carbon tetrachloride, carbon disulfide and the like, whereby the tea-aroma passes into solution in the said solvent. The further steps then comprise the transfer of the said aroma to a slightly diluted alcohol type of solvent, followed by evaporation of the said alcohol and the extraction from the residue thus obtained of the desired purified tea-aroma by means of petroleum ether or its equivalent. From the petroleum ether solution the tea-aroma is recovered by the evaporation of the petroleum ether, whereby the tea-aroma will remain as a pasty mass possessing in a high degree the aromatic flavoring properties of natural tea.

As a specific embodiment of the invention, there will now be discussed in detail the methods and processes by which the invention may be carried out practically.

The well known tea beverage is produced by pouring boiling water on the leaves of the tea plant, for example, of tea *sinensis Lin.* or others or of mate or tea substitutes and then allowing it to draw for a few minutes. If the hot water is allowed to remain on the leaves for too short a time the beverage does not possess much if any strength. If the water is allowed to remain too long on the leaves the beverage becomes bitter and unpalatable. It is not possible to extract the tea aroma from this liquid, as the aroma volatilizes rapidly.

According to the invention as hereinafter described, it is possible to produce a body which contains the tea aroma durably combined in the highest concentration. This substance, hereinafter referred to as "tea aroma body" may be used as an addition to food stuffs, as for example, tea tablets, tea sweets, chewing gum with a tea taste, tea perfumery, and the like.

The invention is based on the following considerations. The tea aroma body is a substance similar to etherial oils and possesses a fragrance and volatility common therewith, but cannot be extracted by distillation with steam in a similar manner to the other etherial oils, for even at the temperature of boiling water the tea-aroma substances are decomposed and changed in flavor.

According to the present invention, the extraction of the tea aroma is carried out in such a manner that the comminuted tea leaves or other constituents of the tea plant, either in the green or black condition, are treated at normal temperature, for example, in a Soxleth extraction apparatus with a volatile organic solvent as petroleum ether, pentane, chloroform, carbon tetrachloride, sulfuric (ethyl) ether, carbon disulfide, or acetone, whereby the tea-aroma body is obtained as a pasty dark green paste after removal of the solvent. The solvents may be recovered almost completely and reused.

The tea-aroma paste thus obtained contains chlorophyll and also fatty and wax-like compounds in addition to the pure tea-aroma body. In this condition the tea-aroma paste is not yet suitable for edible purposes as it possesses an objectionable taste as the aroma is still influenced by the constituents referred to. The aroma paste is therefore first dissolved in 70 to 80% alcohol. A portion of the chlorophyll and the fatty and wax-like constituents will remain undissolved in the alcohol and are separated by filtration from the solution of the aroma body. From this alcoholic aroma solution the alcohol is driven off and there remains a bright yellowish green colored aroma paste. The odor of this paste already exhibits the agreeable aromatic flavor of tea. From this paste the pure tea-aroma body is obtained by treating the paste, for example, with petroleum ether, whereby almost all of the chyorophyll remains behind as an insoluble body from which the tea-aroma body is decanted in solution in the petroleum ether. The chlorophyll thus obtained can be used commercially. The solution of the tea-aroma body in petroleum ether can be treated directly for edible purposes or the petroleum ether is removed by distillation, whereby the pure tea-aroma, according to the origin of the tea or according to the preliminary treatment (that is to say, whether the operation was commenced with a green or black tea) is obtained as either a yellow green or golden yellow paste.

If, for the extraction of the tea-aroma body from the leaves, stems or fruits of the tea plant, petroleum ether or pentane is used in the extraction apparatus, the dark green paste does not contain any substantial quantities of caffeine (theine); whilst when using chloroform, carbon tetrachloride, sulfuric (ethyl) ether and the like, the paste appears dark green and contains caffeine (theine) which is separated before treatment with alcohol, as above described, by dissolving the paste in petroleum ether or pentane which leaves the caffeine as an insoluble residue.

The tea-aroma body may also be obtained by introducing the finely pulverized constituents of the tea plant into molten fat, oil, molten purified wax or molten paraffin and allowing it to stand for a long time in contact with these substances. The resultant solution is then filtered off while slightly warm and is shaken with 70 to 80% alcohol, whereby the aroma body passes over into the alcohol, and after expelling the latter, is obtained in a pure condition. Chlorophyll, tannic acid and caffeine are not extracted by this procedure.

The aroma body obtained according to this process is characterized by its particular fineness.

The pure tea aroma body obtained by the process above described is so highly concentrated and contains the tea aroma so firmly combined that it is necessary to again dilute it according to its purpose of use. The dilution can be effected by the addition of cane sugar, grape sugar, lactose and other means, whereby the tea aroma is deposited on the particles of these substances as a surface coating thereon.

A similar operation is utilized in the production of other edible substances having a tea taste.

It is to be understood that the above process may be applied to other tea-like plants such as mate, mulberry leaves, etc., and in the claim the term "tea" is to be construed as encompassing such plants.

Other known solvents are to be considered as equivalent to the solvents enumerated specifically.

We claim:

The process of preparing a tea-aroma from the leaves or other equivalent parts of plants similar thereto which comprises treating said leaves with an organic solvent, separating said solvent from said leaves, evaporating said solvent whereby the tea-aroma together with impurities remains behind as a pasty mass, treating said mass with slightly diluted alcohol to dissolve the aroma leaving the impurities as insolubles, separating the alcoholic solution from said impurities, evaporating the separated alcoholic solution to pasty consistency and treating the residue with petroleum ether to dissolve the tea-aroma, leaving further impurities in the insoluble state, and recovering the tea-aroma from the petroleum ether by evaporating the latter whereby the tea-aroma remains as a pasty mass suitable for use as a flavoring material having the characteristic taste and aroma of tea.

In witness whereof, we have hereunto subscribed our names.

OTTO STROBACH.
PAUL ALBERT WICKMANN.

CERTIFICATE OF CORRECTION.

Patent No. 1,868,999.                                              July 26, 1932.

OTTO STROBACH ET AL.

It is hereby certified that error appears in the printed specification of the above numbered patent requiring correction as follows: Page 2, lines 79 to 81, strike out the words "A similar operation is utilized in the production of other edible substances having a tea taste."; and that the said Letters Patent should be read with this correction therein that the same may conform to the record of the case in the Patent Office.

Signed and sealed this 22nd day of November, A. D. 1932.

(Seal)                                                   M. J. Moore,
Acting Commissioner of Patents.